United States Patent
Shirinfar et al.

(10) Patent No.: US 10,142,096 B2
(45) Date of Patent: Nov. 27, 2018

(54) AXIAL RATIO AND CROSS-POLARIZATION CALIBRATION IN WIRELESS RECEIVER

(71) Applicant: Movandi Corporation, Newport Beach, CA (US)

(72) Inventors: Farid Shirinfar, Granada Hills, CA (US); Sam Gharavi, Irvine, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US); Ahmadreza Rofougaran, Newport Coast, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

(21) Appl. No.: 15/724,638

(22) Filed: Oct. 4, 2017

(65) Prior Publication Data
US 2018/0034624 A1 Feb. 1, 2018

Related U.S. Application Data

(63) Continuation of application No. 15/225,071, filed on Aug. 1, 2016, now Pat. No. 9,923,712.

(51) Int. Cl.
| | |
|---|---|
| *H04L 7/04* | (2006.01) |
| *H04L 5/00* | (2006.01) |
| *H01Q 13/00* | (2006.01) |
| *H04B 7/08* | (2006.01) |

(52) U.S. Cl.
CPC .............. *H04L 7/048* (2013.01); *H01Q 13/00* (2013.01); *H04B 7/08* (2013.01); *H04L 5/006* (2013.01)

(58) Field of Classification Search
CPC combination set(s) only.
See application file for complete search history.

(56) References Cited

U.S. PATENT DOCUMENTS

| | | |
|---|---|---|
| 2,579,324 A | 12/1951 | Kock |
| 2,652,189 A | 9/1953 | Gorman |

(Continued)

OTHER PUBLICATIONS

Non-Final Office Action in U.S. Appl. No. 15/356,172 dated Mar 14, 2018.

(Continued)

*Primary Examiner* — Junpeng Chen
(74) *Attorney, Agent, or Firm* — Chip Law Group

(57) ABSTRACT

A wireless receiver includes an antenna panel coupled to an H-combined/V-combined generation block, an axial ratio and cross-polarization calibration block to correct for an undesired variation in H-combined and V-combined outputs, and an LHCP/RHCP generation block to produce left-handed circularly polarized (LHCP) and right-handed circularly polarized (RHCP) outputs. The axial ratio and cross-polarization calibration block generates an H-corrected output by summing the H-combined output amplified by a first variable gain amplifier and the V-combined output amplified by a second variable gain amplifier, and a V-corrected output by summing the V-combined output amplified by a third variable gain amplifier and the H-combined output amplified by a fourth variable gain amplifier.

20 Claims, 8 Drawing Sheets

(56) References Cited

U.S. PATENT DOCUMENTS

| | | | |
|---|---|---|---|
| 3,836,973 A * | 9/1974 | Shnitkin | G01R 29/0892 |
| | | | 342/362 |
| 4,380,013 A | 4/1983 | Slysh | |
| 4,739,334 A | 4/1988 | Soref | |
| 4,827,276 A | 5/1989 | Fukuzawa et al. | |
| 4,829,314 A | 5/1989 | Barbier et al. | |
| 5,936,577 A | 8/1999 | Shoki et al. | |
| 5,936,588 A | 8/1999 | Rao et al. | |
| 6,297,774 B1 | 10/2001 | Chung | |
| 6,307,502 B1 | 10/2001 | Marti-Canales et al. | |
| 6,307,507 B1 | 10/2001 | Gross et al. | |
| 6,808,237 B2 | 10/2004 | Schmid et al. | |
| 6,891,511 B1 | 5/2005 | Angelucci | |
| 6,911,956 B2 | 6/2005 | Miyata | |
| 7,170,442 B2 | 1/2007 | Lovberg et al. | |
| 7,664,193 B2 | 2/2010 | Jalali et al. | |
| 7,982,555 B2 | 7/2011 | Rofougaran | |
| 8,274,443 B2 | 9/2012 | Hauhe et al. | |
| 8,482,462 B2 | 7/2013 | Komijani et al. | |
| 8,589,003 B2 | 11/2013 | Brand et al. | |
| 8,618,983 B2 | 12/2013 | Chen et al. | |
| 9,537,214 B2 * | 1/2017 | Corman | H01Q 3/34 |
| 9,638,795 B2 | 5/2017 | Ahmed | |
| 9,692,489 B1 | 6/2017 | Rofougaran et al. | |
| 9,722,322 B2 * | 8/2017 | Bertin | H01Q 21/24 |
| 9,819,410 B1 | 11/2017 | Azevedo et al. | |
| 2002/0165001 A1 | 11/2002 | Phillips et al. | |
| 2003/0122724 A1 | 7/2003 | Shelley et al. | |
| 2004/0080455 A1 | 4/2004 | Lee | |
| 2004/0196184 A1 | 10/2004 | Hollander et al. | |
| 2005/0205720 A1 | 9/2005 | Peltz et al. | |
| 2006/0128336 A1 * | 6/2006 | Waltman | H01Q 19/17 |
| | | | 455/273 |
| 2006/0273959 A1 | 12/2006 | Kawasaki | |
| 2008/0100504 A1 | 5/2008 | Martin et al. | |
| 2008/0163693 A1 | 7/2008 | Sfez et al. | |
| 2010/0090898 A1 | 4/2010 | Gallagher et al. | |
| 2010/0149039 A1 | 6/2010 | Komijani et al. | |
| 2010/0261440 A1 * | 10/2010 | Corman | H01Q 3/26 |
| | | | 455/91 |
| 2011/0025432 A1 | 2/2011 | Gagnon et al. | |
| 2011/0291891 A1 | 12/2011 | Nsenga et al. | |
| 2012/0143407 A1 | 6/2012 | Murthy | |
| 2012/0272857 A1 | 11/2012 | Graab et al. | |
| 2013/0023210 A1 | 1/2013 | Rofougaran | |
| 2013/0069831 A1 | 3/2013 | Friedman et al. | |
| 2013/0088393 A1 | 4/2013 | Lee et al. | |
| 2013/0173094 A1 | 7/2013 | Cooper et al. | |
| 2013/0208608 A1 | 8/2013 | Piazza et al. | |
| 2014/0009347 A1 * | 1/2014 | Bertin | H01Q 1/2258 |
| | | | 343/725 |
| 2014/0022109 A1 | 1/2014 | Lee et al. | |
| 2014/0035731 A1 | 2/2014 | Chan et al. | |
| 2014/0035780 A1 | 2/2014 | Trotta | |
| 2014/0129060 A1 | 5/2014 | Cooper et al. | |
| 2014/0184439 A1 | 7/2014 | Ainspan et al. | |
| 2014/0191905 A1 | 7/2014 | Kamgaing | |
| 2014/0210668 A1 | 7/2014 | Wang et al. | |
| 2015/0015449 A1 | 1/2015 | Jecko et al. | |
| 2015/0129668 A1 | 5/2015 | Kam et al. | |
| 2015/0324683 A1 | 11/2015 | Linfield | |
| 2015/0341098 A1 | 11/2015 | Kngeletti et al. | |
| 2016/0141248 A1 | 5/2016 | Pueschner et al. | |
| 2016/0240919 A1 | 8/2016 | Wu et al. | |
| 2017/0054216 A1 | 2/2017 | Shi et al. | |

OTHER PUBLICATIONS

Abbaspour-Tamijani et al., "Enhancing the Directivity of Phased Array Antennas Using Lens-Arrays," Progress in Electromagnetics Research M, vol. 29, 2013. pp. 41-64.

Advisory Action in U.S. Appl. No. 15/724,638 dated May 25, 2018.

Final Office Action in U.S. Appl. No. 15/724,638 dated Mar. 14, 2018.

Final Office Action in U.S. Appl. No. 14/488,355 dated Mar. 4, 2016.

Imbert et al., "Design and Performance Evaluation of a Dielectric Flat Lens Antenna for Millimeter-Wave Applications," IEEE Antennas and Wireless Propagation Letters, vol. 14, 2015. pp. 1-4.

International Search Report and Written Opinion in PCT/US2014/055984 dated Jun. 18, 2015, pp. 1-12.

Non-Final Office Action in U.S. Appl. No. 14/488,355 dated Nov. 13, 2015.

Non-Final Office Action in U.S. Appl. No. 15/225,071 dated Aug. 21, 2017.

Non-Final Office Action in U.S. Appl. No. 15/278,970 dated Jan. 3, 2018.

Non-Final Office Action in U.S. Appl. No. 15/279,171 dated Apr. 24, 2018.

Non-Final Office Action in U.S. Appl. No. 15/279,219 dated Dec. 27, 2017.

Non-Final Office Action in U.S. Appl. No. 15/335,034 dated Apr. 6, 2018.

Non-Final Office Action in U.S. Appl. No. 15/600,443 dated Dec. 27, 2017.

Non-Final Office Action in U.S. Appl. No. 15/640,174 dated Jun. 8, 2018.

Non-Final Office Action in U.S. Appl. No. 15/724,638 dated Nov. 6, 2017.

Notice of Allowance in U.S. Appl. No. 14/488,355 dated Jun. 8, 2016.

Notice of Allowance in U.S. Appl. No. 15/225,071 dated Nov. 22, 2017.

Notice of Allowance in U.S. Appl. No. 15/255,656 dated Apr. 10, 2018.

Notice of Allowance in U.S. Appl. No. 15/256,038 dated Apr. 19, 2017.

Restriction Requirement in U.S. Appl. No. 15/279,171 dated Dec. 21, 2017.

Baggett, Benjamin M.W. Optimization of Aperiodically Spaced Phased Arrays for Wideband Applications. MS Thesis. Virginia Polytechnic Institute and State University, 2011. pp. 1-137.

Non-Final Office Action in U.S. Appl. No. 15/432,018 dated Nov. 6, 2017.

Non-Final Office Action in U.S. Appl. No. 15/432,091 dated Nov. 22, 2017.

Non-Final Office Action in U.S. Appl. No. 15/432,185 dated Dec. 5, 2017.

Notice of Allowance in U.S. Appl. No. 15/356,172 dated Sep. 26, 2018.

Notice of Allowance in U.S. Appl. No. 15/432,091 dated Apr. 11, 2018.

* cited by examiner

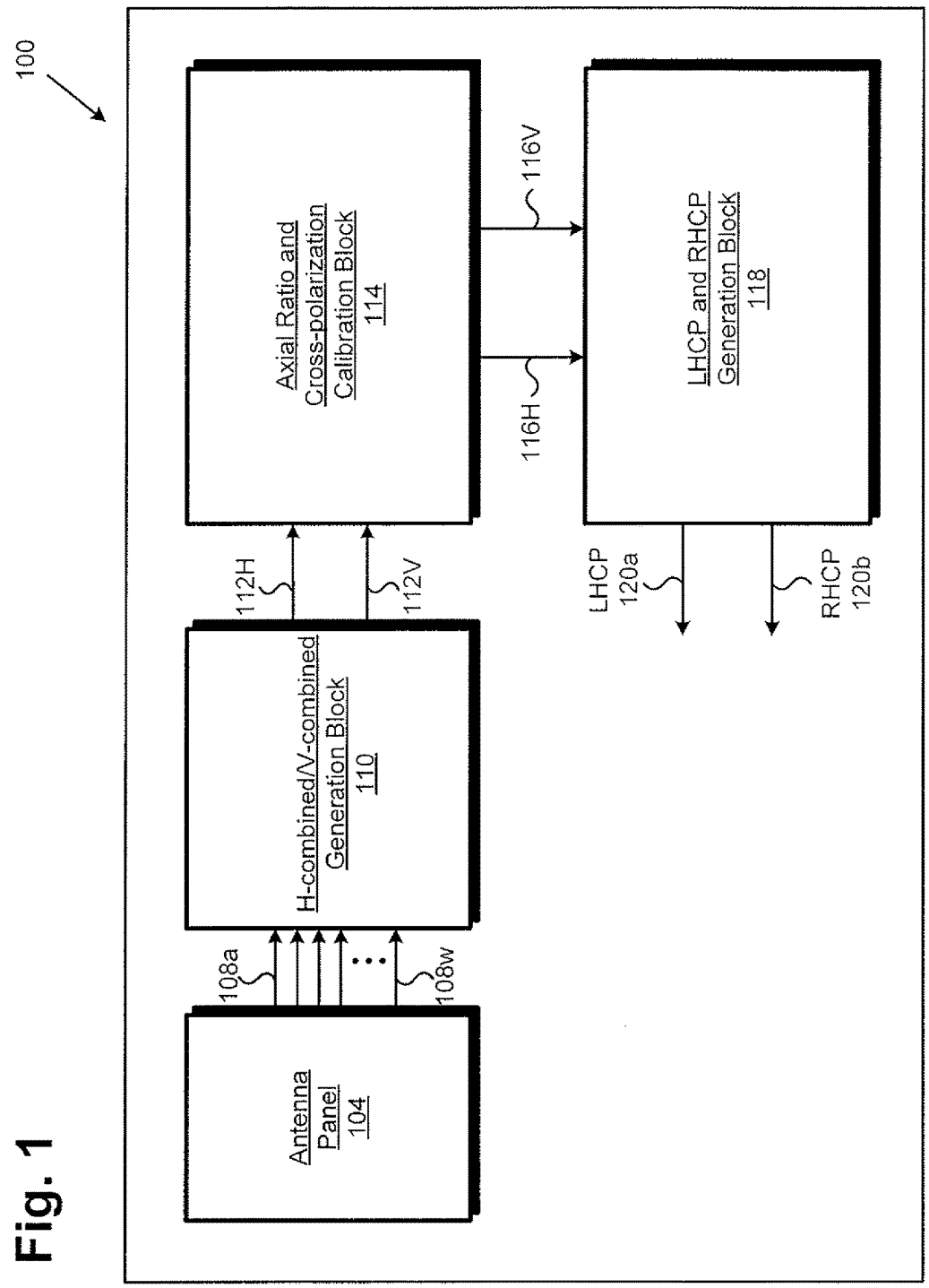

Fig. 3B

$$\begin{bmatrix} V\text{-}comb. \\ H\text{-}comb. \end{bmatrix}_{\substack{312V \\ 312H}} = \underbrace{\begin{bmatrix} \alpha & \beta \\ \beta' & \alpha' \end{bmatrix}}_{A} \times \begin{bmatrix} V\text{-}crt. \\ H\text{-}crt. \end{bmatrix}_{\substack{316V \\ 316H}}$$

$$Axial\ Ratio \approx \frac{\alpha}{\alpha'}$$

$$Cross-Polarization \approx \frac{\alpha}{\beta} \frac{\alpha}{\alpha'}$$

$$\begin{bmatrix} V\text{-}crt. \\ H\text{-}crt. \end{bmatrix}_{\substack{316V \\ 316H}} = A^{-1} \times \begin{bmatrix} V\text{-}comb. \\ H\text{-}comb. \end{bmatrix}_{\substack{312V \\ 312H}}$$

$$A^{-1} = \frac{1}{\alpha \cdot \alpha' - \beta \cdot \beta'} \begin{bmatrix} \alpha' & -\beta \\ -\beta' & \alpha \end{bmatrix} = \begin{bmatrix} M & N \\ N' & M' \end{bmatrix}$$

$$\begin{bmatrix} M & N \\ N' & M' \end{bmatrix} \times \begin{bmatrix} V\text{-}comb. \\ H\text{-}comb. \end{bmatrix} = \begin{bmatrix} M \times V\text{-}comb. + N \times H\text{-}comb. \\ N' \times V\text{-}comb. + M' \times H\text{-}comb. \end{bmatrix}$$

Fig. 6
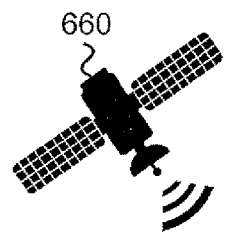
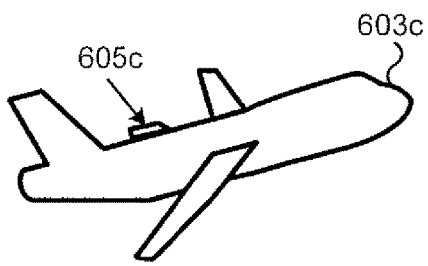
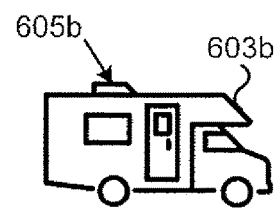
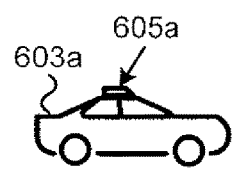

AXIAL RATIO AND CROSS-POLARIZATION CALIBRATION IN WIRELESS RECEIVER

The present application is a continuation application of U.S. patent application Ser. No. 15/225,071, titled "Wireless Receiver with Axial Ratio and Cross-Polarization Calibration," filed on Aug. 1, 2016. The above-identified application is hereby incorporated fully by reference into the present application.

BACKGROUND

Wireless communications, such as satellite communications, utilize electromagnetic waves to transfer information between two or more points. An electromagnetic wave includes an electric field and a magnetic field that are perpendicular to each other and to the direction of propagation. The orientation of the electric field may be characterized by its polarization, as the electromagnetic wave propagates through space. Two common types of polarizations are linear (e.g. vertical and horizontal) polarization and circular (e.g., right-hand and left-hand) polarization.

When a change in a position of a wireless receiver is made, the resulting undesired variations in the received linearly polarized signals cause an increase in bit error rate (BER) in the wireless receiver. Accordingly, there is a need for a wireless receiver that efficiently and effectively calibrates and corrects for undesirable variations in the received signals.

SUMMARY

The present disclosure is directed to a wireless receiver with axial ratio and cross-polarization calibration, substantially as shown in and/or described in connection with at least one of the figures, and as set forth in the claims.

BRIEF DESCRIPTION OF THE DRAWINGS

FIG. 1 illustrates a functional block diagram of a wireless receiver according to one implementation of the present application.

FIG. 3B illustrates an exemplary method utilized by the axial ratio and cross-polarization calibration block in FIG. 3A according to one implementation of the present application.

FIG. 6 is an exemplary wireless communications system utilizing exemplary wireless receivers according to one implementation of the present application.

DETAILED DESCRIPTION

Figure 2A:
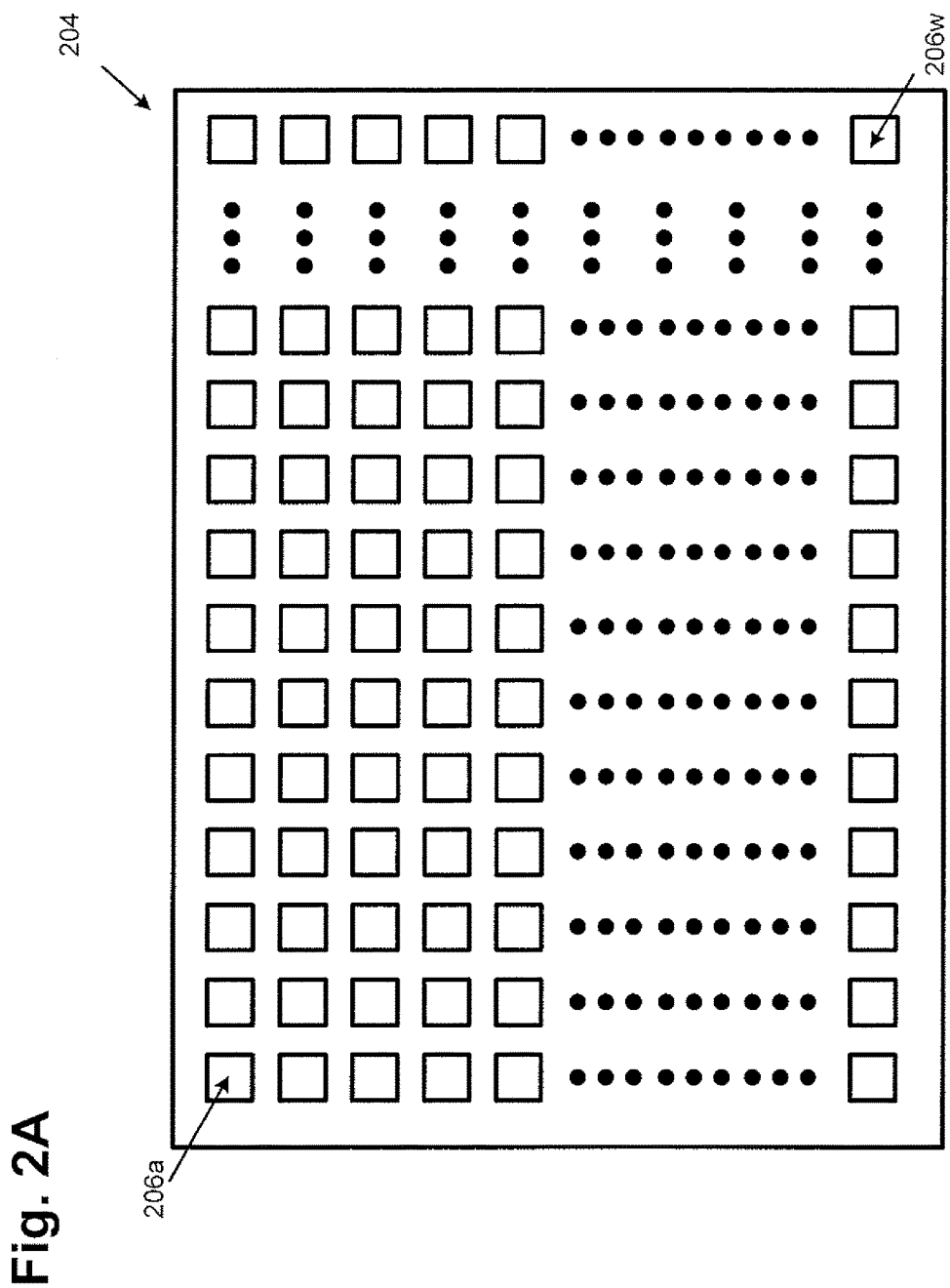
FIG. 2A illustrates a top plan view of a portion of an antenna panel of an exemplary wireless receiver according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As illustrated in FIG. 1, wireless receiver 100 includes antenna panel 104, H-combined/V-combined generation block 110, axial ratio and cross-polarization calibration block 114, and left-handed circularly polarized (LHCP)/right-handed circularly polarized (RHCP) generation block 118. Wireless receiver 100 may be mounted on a moving object (e.g., a vehicle) or a stationary object (e.g., a building). Although wireless receiver 100 is described as a receiver, it should be understood that wireless receiver 100 may also function as a transmitter to communicate transmit signals to one or more wireless devices.

In the present implementation, antenna panel 104 is a flat panel array having a plurality of antennas. When in a reception mode, antenna panel 104 is configured to receive one or more signals from a wireless transmitter, where each antenna in antenna panel 104 may provide a horizontally-polarized signal and a vertically-polarized signal, as a pair of linearly polarized signals. As illustrated in FIG. 1, antenna panel 104 is coupled to H-combined/V-combined generation block 110, and configured to provide linearly polarized signals 108a through 108w to H-combined/V-combined generation block 110.

As illustrated in FIG. 1, H-combined/V-combined generation block 110 is configured to receive linearly polarized signals 108a through 108w from antenna panel 104, and provide H-combined output 112H and V-combined output 112V to axial ratio and cross-polarization calibration block 114. In one implementation, H-combined/V-combined generation block 110 is configured to combine all of the horizontally-polarized outputs from the antennas in antenna panel 104 to provide H-combined output 112H. H-combined/V-combined generation block 110 is also configured to combine all of the vertically-polarized outputs from the antennas in antenna panel 104 to provide V-combined output 112V. As discussed further below, H-combined/V-combined generation block 110 is configured to add powers and combine phases of individual horizontally-polarized outputs to form H-combined output 112H. Also, H-combined/V-combined generation block 110 is configured to add powers and combine phases of individual vertically-polarized outputs to form V-combined output 112V.

As illustrated in FIG. 1, axial ratio and cross-polarization calibration block 114 is configured to receive H-combined output 112H and V-combined output 112V from H-combined/V-combined generation block 110, and provide H-corrected output 116H and V-corrected output 116V to LHCP/RHCP generation block 118. In the present implementation, axial ratio and cross-polarization calibration block 114 is configured to correct for undesired variations in H-combined output 112H and V-combined output 112V, for example, due to a change in a position of wireless receiver 100, such as a change in an elevation angle of antenna panel 104. In another implementation, undesired variations in H-combined output 112H and V-combined output 112V may be due to a change in a position of a wireless transmitter (e.g. a satellite) transmitting signals to wireless receiver 100.

As illustrated in FIG. 1, H-corrected output 116H and V-corrected output 116V are provided to LHCP/RHCP generation block 118, where H-corrected output 116H and V-corrected output 116V from axial ratio and cross-polarization calibration block 114 are converted to left-handed circularly polarized (LHCP) output 120a and right-handed circularly polarized (RHCP) output 120b. As a result of calibrating H-combined output 112H and V-combined output 112V using axial ratio and cross-polarization calibration block 114, H-corrected output 116H and V-corrected output 116V ensure that the combined linearly polarized outputs from axial ratio and cross-polarization calibration block 114 are converted to circularly polarized outputs (e.g., LHCP output 120a and RHCP output 120b) to avoid undesired elliptically polarized outputs, thereby reducing bit error rate in LHCP output 120a and RHCP output 120b of wireless receiver 100.

Referring to FIG. 2A, FIG. 2A illustrates antenna panel 204, which may correspond to antenna panel 104 in FIG. 1. As illustrated in FIG. 2A, antenna panel 204 includes a plurality of antennas, e.g., antenna 206a through antenna 206w, collectively referred to as antennas 206. In one implementation, antennas 206 may be configured to receive signals from one or more commercial geostationary communication satellites, for example, having a very large bandwidth in the 10 GHz to 20 GHz frequency range and a very high data rate. In another implementation, antennas 206 may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

In one implementation, for a wireless transmitter transmitting signals at 100 GHz (i.e., $\lambda$=3 mm), each antenna in antenna panel 204 in a wireless receiver (e.g., wireless receiver 100 in FIG. 1) needs an area of at least a quarter wavelength (e.g., $\lambda/4$=0.75 mm) by a quarter wavelength (e.g., $\lambda/4$=0.75 mm) to receive the transmitted signals. As illustrated in FIG. 2A, antennas 206 in antenna panel 204 may have a square shape having dimensions of 0.75 mm by 0.75 mm, for example. In one implementation, each adjacent pair of antennas 206 may be separated by a distance of a multiple integer of the quarter wavelength (i.e., $n*\lambda/4$), such as 0.75 mm, 1.5 mm, 2.25 mm and etc. As illustrated in FIG. 2A, antenna panel 204 includes a total of W spatially separated antennas 206. In one implementation, the number of antennas 206 can be as small as 2. In another implementation, the number of antennas 206 can be as large as several thousands (i.e., W=2000). In general, the performance of the wireless receiver improves with the number, W, of antennas 206 in antenna panel 204.

In the present implementation, antenna panel 204 is a flat panel array employing antennas 206a through 206w, where antenna panel 204 is coupled to associated active circuits to form a beam for reception (or transmission). In one implementation, the beam is formed fully electronically by means of phase control devices associated with antennas 206a through 206w. Thus, antenna panel 204 can provide beam forming without the use of mechanical parts.

Figure 2B:
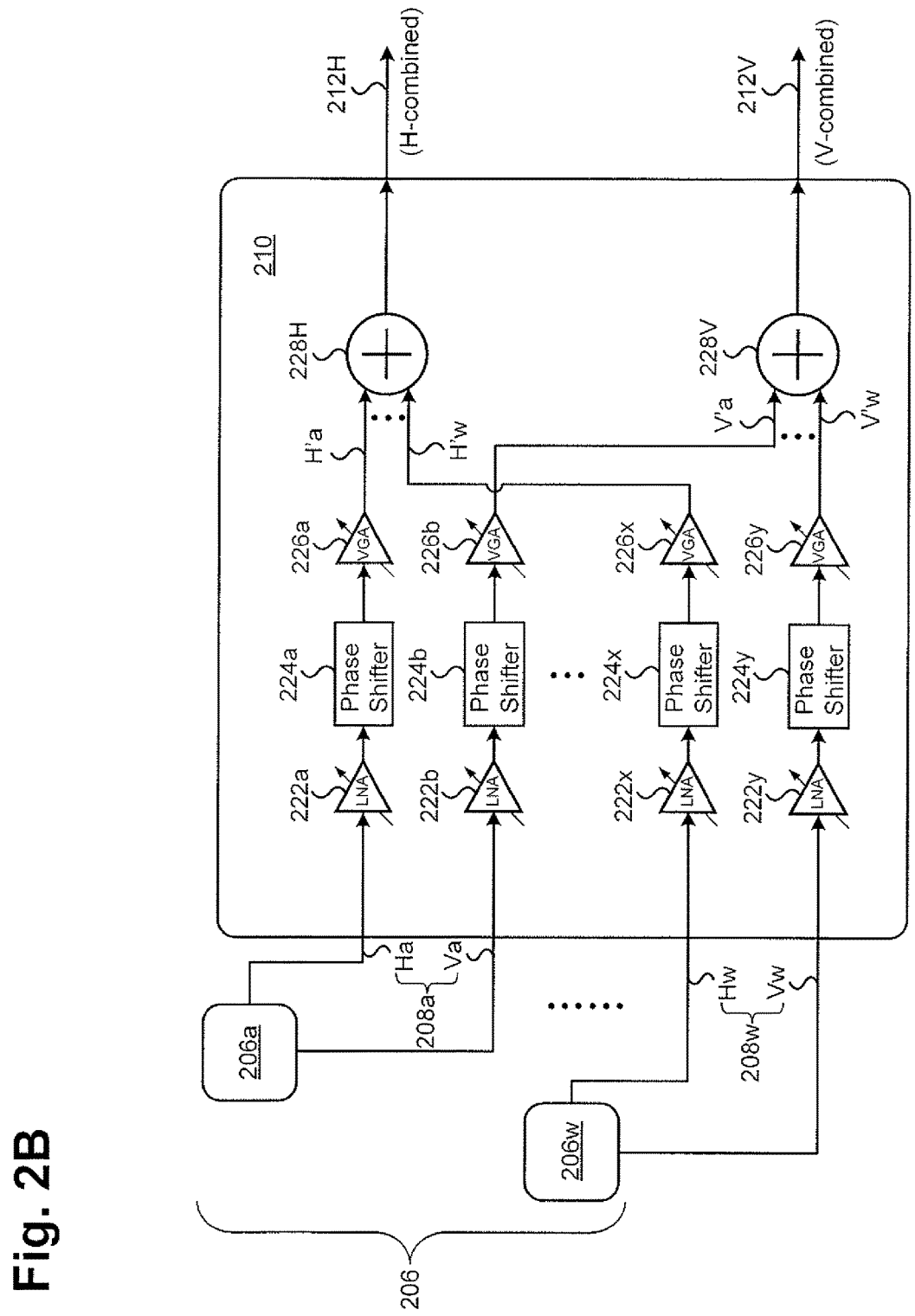
FIG. 2B illustrates a functional block diagram of a portion of an H-combined/V-combined generation block of an exemplary wireless receiver according to one implementation of the present application.

Turning to FIG. 2B, FIG. 2B illustrates H-combined/V-combined generation block 210, which may correspond to H-combined/V-combined generation block 110 in FIG. 1. In one implementation, antennas 206 may be configured to receive signals from one or more commercial geostationary communication satellites, for example, which typically employ linearly polarized signals defined at the satellite with a horizontally-polarized (H) signal having its electric-field oriented parallel with the equatorial plane and a vertically-polarized (V) signal having its electric-field oriented perpendicular to the equatorial plane. As illustrated in FIG. 2B, each antenna 206 is configured to provide an H output and a V output to H-combined/V-combined generation block 210. For example, antenna 206a provides linearly polarized signal 208a, having horizontally-polarized signal Ha and vertically-polarized signal Va, to H-combined/V-combined generation block 210, where linearly polarized signal 208a may correspond to linearly polarized signal 108a in FIG. 1.

As illustrated in FIG. 2B, horizontally-polarized signal Ha from antenna 206a is provided to a receiving circuit having low noise amplifier (LNA) 222a, phase shifter 224a and variable gain amplifier (VGA) 226a, where LNA 222a is configured to generate an output to phase shifter 224a, and phase shifter 224a is configured to generate an output to VGA 226a. In addition, vertically-polarized signal Va from antenna 206a is provided to a receiving circuit including low noise amplifier (LNA) 222b, phase shifter 224b and variable gain amplifier (VGA) 226b, where LNA 222b is configured to generate an output to phase shifter 224b, and phase shifter 224b is configured to generate an output to VGA 226b.

Similarly, antenna 206w provides linearly polarized signal 208w, having horizontally-polarized signal Hw and vertically-polarized signal Vw, to H-combined/V-combined generation block 210, where linearly polarized signal 208w may correspond to linearly polarized signal 108w in FIG. 1. As illustrated in FIG. 2B, horizontally-polarized signal Hw from antenna 206w is provided to a receiving circuit including low noise amplifier (LNA) 222x, phase shifter 224x and variable gain amplifier (VGA) 226x, where LNA 222x is configured to generate an output to phase shifter 224x, and phase shifter 224x is configured to generate an output to VGA 226x. In addition, vertically-polarized signal Vw from antenna 206w is provided to a receiving circuit including low noise amplifier (LNA) 222y, phase shifter 224y and variable gain amplifier (VGA) 226y, where LNA 222y is configured to generate an output to phase shifter 224y, and phase shifter 224y is configured to generate an output to VGA 226y. In one implementation, at least one of horizontally-polarized signals Ha through Hw and vertically-polarized signals Va through Vw may be phase-shifted in H-combined/V-combined generation block 210 by a phase shifter (e.g., phase shifters 224a through 224y).

As illustrated in FIG. 2B, amplified output H'a from VGA 226a, amplified horizontally-polarized signal H'w from VGA 226x, and other amplified horizontally-polarized signal from other antennas 206 (not explicitly shown in FIG. 2B) are provided to summation block 228H. Summation block 228H is configured to sum all of the powers of the amplified horizontally-polarized signals H'a through H'w, and combine all of the phases of the amplified horizontally-polarized signals H'a through H'w, to provide H-combined output 212H. In addition, amplified vertically-polarized signal V'a from VGA 226b, amplified vertically-polarized signal V'w from VGA 226y, and other amplified vertically-polarized signals from other antennas 206 (not explicitly shown in FIG. 2B) are provided to summation block 228V. Summation block 228V is configured to sum all of the powers of the amplified vertically-polarized signals V'a through V'w, and combine all of the phases of the amplified vertically-polarized signals V'a through V'w, to provide V-combined output 212V.

Figure 3A:
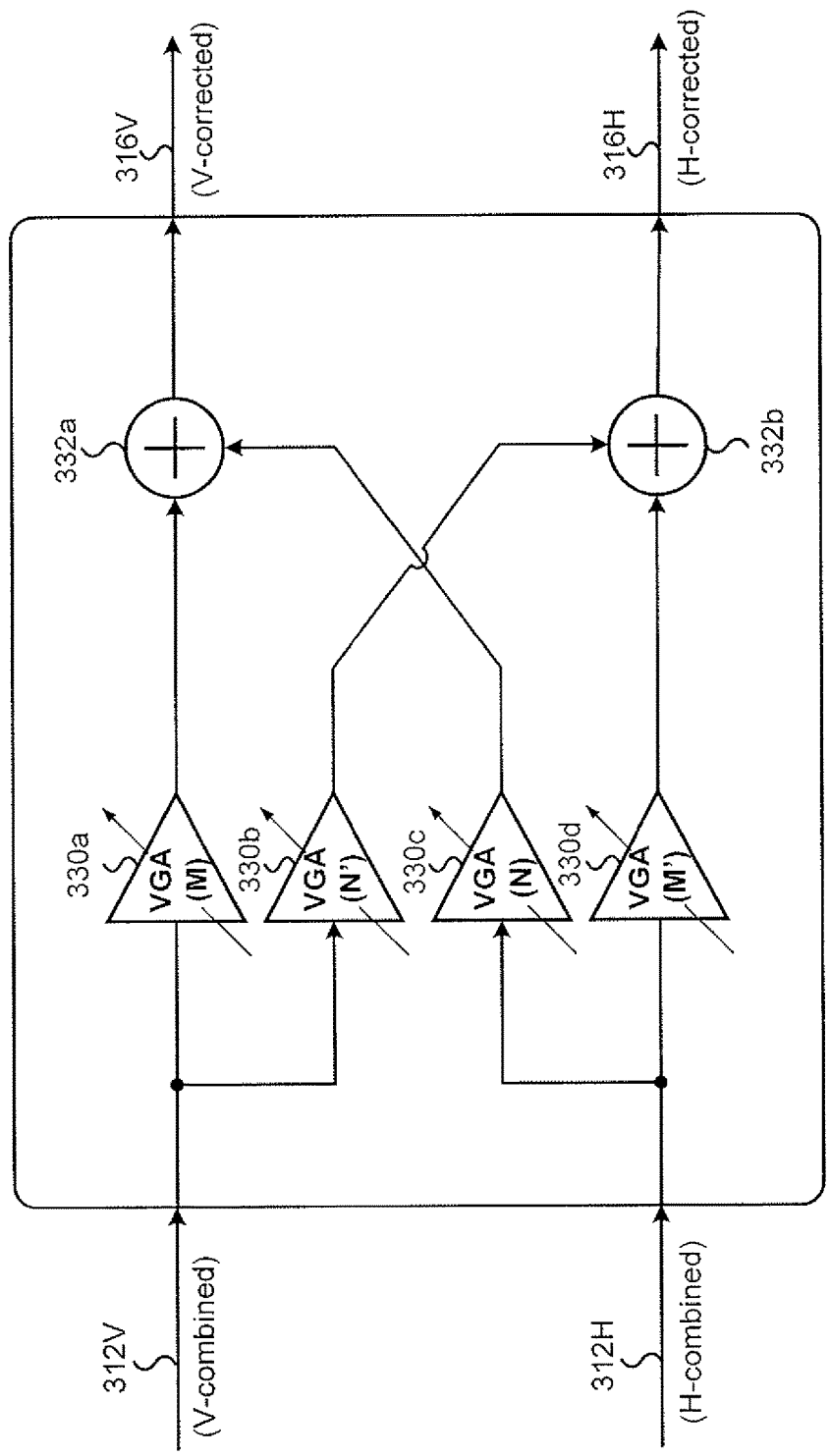
FIG. 3A illustrates a functional block diagram of an axial ratio and cross-polarization calibration block of an exemplary wireless receiver according to one implementation of the present application.

Referring to FIG. 3A, FIG. 3A illustrates axial ratio and cross-polarization calibration block 314, which may correspond to axial ratio and cross-polarization calibration block 114 in FIG. 1. In the present implementation, axial ratio and cross-polarization calibration block 314 is configured to receive H-combined output 312H and V-combined output 312V, and generate V-corrected output 316V and H-corrected output 316H. As illustrated in FIG. 3A, axial ratio and cross-polarization calibration block 314 is configured to generate V-corrected output 316V through summation block 332a by summing V-combined output 312V amplified by variable gain amplifier (VGA) 330a and H-combined output 312H amplified by variable gain amplifier (VGA) 330c. In addition, axial ratio and cross-polarization calibration block 314 is configured to generate H-corrected output 316H through summation block 332b by summing H-combined output 312H amplified by variable gain amplifier (VGA) 330d and V-combined output 312V amplified by variable gain amplifier (VGA) 330b. As illustrated in FIG. 3A, VGAs 330a, 330b, 330c and 330d may have respective gains of M, N', N and M'.

In order to generate pure circular polarized signals based on linearly polarized signals, the linearly polarized V-combined output 312V and H-combined output 312H, which may have been distorted due to, for example, a change in a position of a wireless receiver (e.g., wireless receiver 100 in FIG. 1) relative to a wireless transmitter, need to be calibrated to correct for undesired variations in the H-combined and V-combined outputs. Without any undesired variation, V-combined output 312V and H-combined output 312H would have the same amplitude and be 90° out of phase. However, due to undesired variations, V-combined output 312V and H-combined output 312H may be distorted, such that the conversion of V-combined output 312V and H-combined output 312H may result in elliptically polarized signals, as opposed to pure circularly polarized signals. Thus, V-combined output 312V and H-combined output 312H need to be calibrated so that the corrected signals, e.g., H-corrected output 316H and V-corrected output 316V, may be converted to pure circularly polarized signals, for example, as intended by commercial geostationary communications.

Referring to FIG. 3B, V-combined output 312V and H-combined output 312H, which are the combined H and V signals received, for example, by antennas 206 in FIG. 2B, need be converted to V-corrected output 316V and H-corrected output 316H, respectively. The relationship between V-combined output 312V and H-combined output 312H and V-corrected output 316V and H-corrected output 316H may be expressed as:

$$\begin{bmatrix} V\text{-}comb. \\ H\text{-}comb. \end{bmatrix} = A \times \begin{bmatrix} V\text{-}crt. \\ H\text{-}crt. \end{bmatrix} \qquad \text{Equation (1)}$$

where A is a matrix, $$A = \begin{bmatrix} \alpha & \beta \\ \beta' & \alpha' \end{bmatrix} \qquad \text{Equation (2)}$$

In matrix A, $$\text{Axial Ratio} \approx \frac{\alpha}{\alpha'} \text{ and} \qquad \text{Equation (3)}$$

$$\text{Cross-Polarization} \approx \frac{\alpha}{\beta}. \qquad \text{Equation (4)}$$

If not corrected, V-combined output 312V and H-combined output 312H would be converted to elliptically polarized signals, as opposed to pure circularly polarized signals, which may increase the bit error rate (BER) in the wireless receiver. In order to correct V-combined output 312V and H-combined output 312H to restore V-corrected output 316V and H-corrected output 316H, the following equation can be used:

$$\begin{bmatrix} V\text{-}crt. \\ H\text{-}crt. \end{bmatrix} = A^{-1} \times \begin{bmatrix} V\text{-}comb. \\ H\text{-}comb. \end{bmatrix} \qquad \text{Equation (5)}$$

Where $A^{-1}$ is a correction matrix:

$$A^{-1} = \frac{1}{\alpha \cdot \alpha' - \beta \cdot \beta'} \begin{bmatrix} \alpha' & -\beta \\ -\beta' & \alpha \end{bmatrix} \qquad \text{Equation (6)}$$

$$= \begin{bmatrix} M & N \\ N' & M' \end{bmatrix}.$$

Equation (5) can be expanded as:

$$\begin{bmatrix} V\text{-}crt. \\ H\text{-}crt. \end{bmatrix} = \begin{bmatrix} M & N \\ N' & M' \end{bmatrix} \times \begin{bmatrix} V\text{-}comb. \\ H\text{-}comb. \end{bmatrix} = \begin{bmatrix} M \times V\text{-}comb. + N \times H\text{-}comb. \\ N' \times V\text{-}comb. + M' \times H\text{-}comb. \end{bmatrix}$$

Thus, V-corrected output 316V=M×V-combined output 312V+N×H-combined output 312H, and H-corrected output 316H=N'×V-combined output 312V+M'×H-combined output 312H.

As can be seen in FIG. 3A, the respective gains of VGAs 330a, 330b, 330c and 330d are M, N', N and M', which correspond to M, N', N and M', respectively, in correction matrix $A^{-1}$ above. After implementing gains M, N', N and M' in VGAs 330a, 330b, 330c and 330d, respectively, in FIG. 3A, axial ratio and cross-polarization calibration block 314 is generates V-corrected output 316V and H-corrected output 316H, which may be subsequently converted to pure circularly polarized signals. Thus, gains M, N', N and M' in respective VGAs 330a, 330b, 330c and 330d are configured to reduce bit error rate in the LHCP and RHCP outputs of the wireless receiver.

It is noted that α, α', β, and β' are determined as a result of testing and measuring response of H-combined/V-combined generation block 210 using incident test waves, in a manner set forth below:

(1) All amplifiers such as LNA 222a and/or VGA 226a, and LNA 222x and/or VGA 226x in the Horizontal paths, i.e. paths connected to horizontally-polarized signals Ha through Hw from antennas 206a through 206w, are turned off and the output powers of V-combined 212V and H-combined 212H are measured while the antenna panel is receiving a first incident test wave ("first test wave"). The ratio of V-combined output power (first test wave)/H-combined output power (first test wave) is the ratio of α/β.

(2) All amplifiers such as LNA 222b and/or VGA 226b, and LNA 222y and/or VGA 226y in the Vertical paths, i.e. paths connected to vertically-polarized signals Va through Vw from antennas 206a through 206w, are turned off and the output powers of V-combined 212V and H-combined 212H are measured using a second incident test wave ("second test wave"). The ratio of V-combined output power (second test wave)/H-combined output power (second test wave) is the ratio of α'/β'.

(3) The ratio of V-combined output power (first test wave)/V-combined output power (second test wave) is the ratio of α/α'.

(4) The ratio of H-combined output power (first test wave)/H-combined output power (second test wave) is the ratio of β/β'.

It is also noted that the first test wave and the second test wave used in the above measurements may have different characteristics, i.e. may be different in power, direction, phase, etc . . . , or may have identical characteristics, i.e. may be the same in power, direction, phase, etc. . . .

Figure 4:
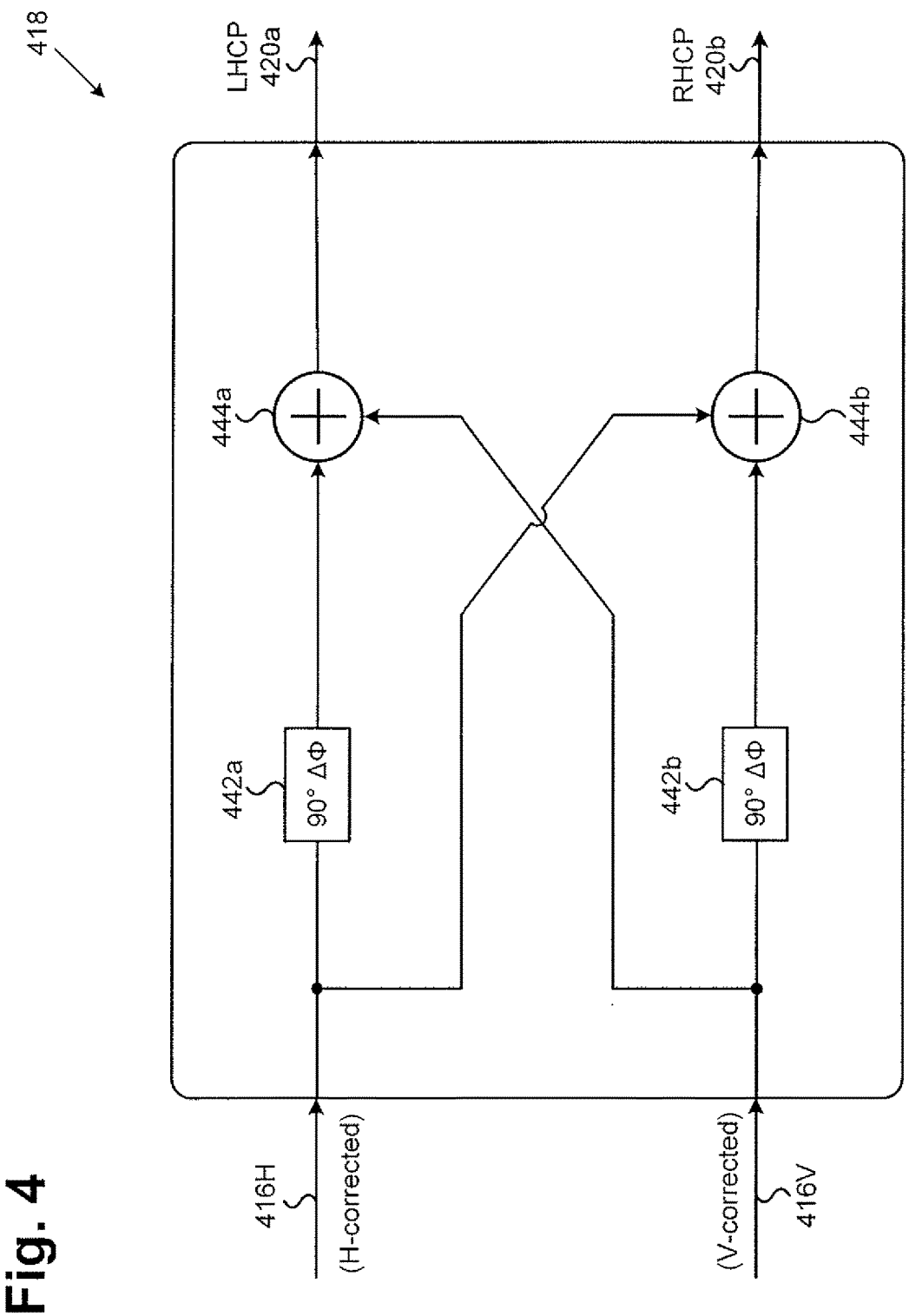
FIG. 4 illustrates a functional block diagram of a left-handed circularly polarization (LHCP) and right-handed circularly polarization (RHCP) generation block of an exemplary wireless receiver according to one implementation of the present application.

Referring to FIG. 4, FIG. 4 illustrates LHCP/RHCP generation block 418, which may correspond to LFICP/RHCP generation block 118 in FIG. 1. In the present implementation, LHCP/RHCP generation block 418 is configured to receive H-corrected output 416H and V-corrected output 416V, and generate left-handed circularly polarized (LHCP) output 420a and right-handed circularly polarized (RHCP) output 420b. As illustrated in FIG. 4, LHCP/RHCP generation block 418 is configured to generate LHCP output 420a by summing 90° phase shifted H-corrected output 416H and V-corrected output 416V using summation block 444a. LHCP/RHCP generation block 418 is also configured to generate RHCP output 420 b by summing 90° phase shifted V-corrected output 416V and H-corrected output 416H using summation block 444b. In one implementation, H-corrected output 416H and V-corrected output 416V in FIG. 4 may correspond to H-corrected output 316H and V-corrected output 316V of axial ratio and cross-polarization calibration block 314 in FIG. 3A, where H-corrected output 416H and V-corrected output 416V may have the same amplitude and a 90° phase difference. Consequently, H-corrected output 416H and V-corrected output 416V ensure that LHCP output 420a and RHCP output 420b of LHCP/RHCP generation block 418 are pure circularly polarized signals, which may be subsequently converted to digital signals for signal processing.

Figure 5:
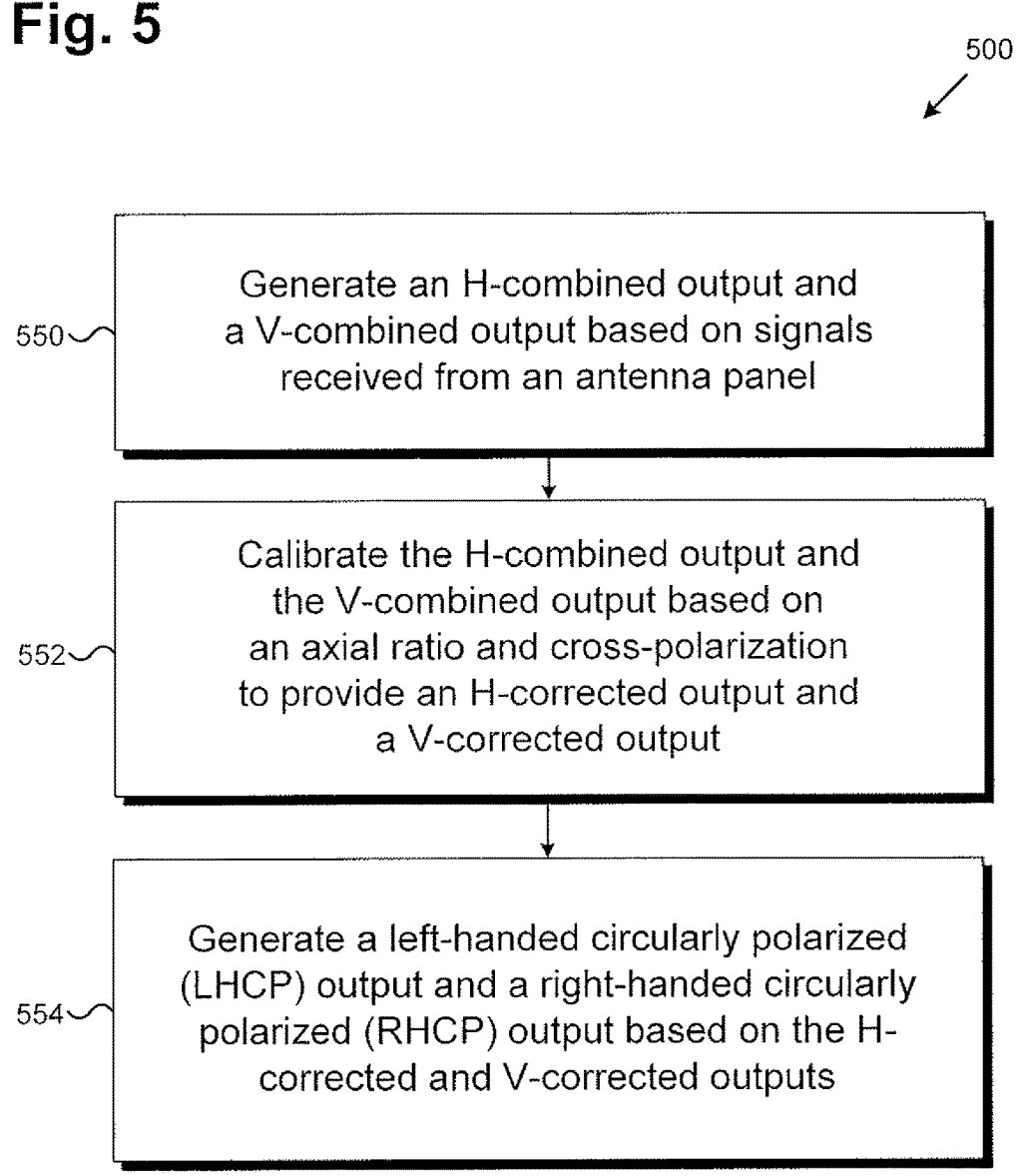
FIG. 5 is flowchart illustrating an exemplary method utilized in a wireless receiver according to one implementation of the present application.

Referring now to FIG. 5, FIG. 5 is a flowchart illustrating an exemplary method for use in a wireless receiver according to one implementation of the present application. Certain details and features have been left out of the flowchart that are apparent to a person of ordinary skill in the art. For example, an action may consist of one or more subactions as known in the art. Actions 550, 552 and 554 shown in flowchart 500 are sufficient to describe one implementation of the present inventive concepts, other implementations of the present inventive concepts may utilize actions different from those shown in flowchart 100.

As illustrated in FIG. 5, action 550 includes generating an H-combined output and a V-combined output based on signals received from an antenna panel. With reference to FIGS. 2A and 2 B, H-combined/V-combined generation block 210, which may correspond to H-combined/V-combined generation block 110 in FIG. 1, generates H-combined output 212H and V-combined output 212V based on signals received from an antenna panel having antennas 206, as discussed above.

As shown in FIG. 5, action 552 includes calibrating the H-combined output and the V-combined output based on an axial ratio and cross-polarization to provide an H-corrected output and a V-corrected output. With reference to FIGS. 3A and 3B, axial ratio and cross-polarization calibration block 314, which may correspond to axial ratio and cross-polarization calibration block 114 in FIG. 1, generates H-corrected output 316H and V-corrected output 316V based on the axial ratio and cross-polarization of H-combined output 312H and V-combined output 312V, as discussed above.

As further shown in FIG. 5, action 554 includes generating a left-handed circularly polarized (LHCP) output and a right-handed circularly polarized (RHCP) output based on the H-corrected output and the V-corrected output. With reference to FIG. 4, LHCP/RHCP generation block 418, which may correspond to LHCP/RHCP generation block 118 in FIG. 1, generates LHCP output 420a and RHCP output 420b based on H-corrected output 416H and V-corrected output 416V, as discussed above.

Referring now to FIG. 6, FIG. 6 illustrates an exemplary wireless communications system adopting axial ratio and cross-polarization calibration according to one implementation of the present application. As illustrated in FIG. 6, wireless transmitter 660 (e.g., satellite) is configured to transmit signals to various targeted wireless receivers, such as wireless receiver 605a mounted on car 603a, wireless receiver 605b mounted on recreational vehicle 603b, wireless receiver 605c mounted on airplane 603c and wireless receiver 605d mounted on house 603d. It should be understood that car 603a, recreational vehicle 603b and airplane 603c may each be moving, thereby causing a change in position of corresponding wireless receivers 605a through 605c. It should be understood that, although house 603d can be stationary, the relative position of wireless receiver 605d to wireless transmitter 660 may also change, for example, due to wind or other factors. In the present implementation, wireless receivers 605a through 605d may each correspond to wireless receiver 100 in FIG. 1, where axial ratio and cross-polarization calibration block 114 is configured to calibrate and correct for undesired variations in the received linearly polarized signals, as discussed above.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless receiver, comprising:
   an antenna panel coupled to an H-combined/V-combined generation block;
   an H-combined output, corresponding to a plurality of horizontal paths, from said H-combined/V-combined generation block,
   wherein said plurality of horizontal paths include a plurality of first elements;

a V-combined output, corresponding to a plurality of vertical paths, from said H-combined/V-combined generation block,
wherein said plurality of vertical paths include a plurality of second elements;
an axial ratio and cross-polarization calibration block to correct for an undesired variation in said H-combined output and said V-combined output, based on a ratio of an H-combined output power of said H-combined output and a V-combined output power of said V-combined output,
wherein one of said plurality of first elements or said plurality of second elements are turned off for determination of said ratio; and
an LHCP/RHCP generation block to produce, a left-handed circularly polarized (LHCP) output and a right-handed circularly polarized (RHCP) output, based on said correction of said H-combined output and said V-combined output.

2. The wireless receiver of claim 1, wherein said undesired variation is due to a change in a position of said antenna panel.

3. The wireless receiver of claim 2, wherein said change in said position is a change in an elevation angle of said antenna panel.

4. The wireless receiver of claim 1, wherein said undesired variation is due to a change in a position of a transmitter providing transmit signals to said wireless receiver.

5. The wireless receiver of claim 1, wherein said axial ratio and cross-polarization calibration block reduces a bit error rate in said LHCP output and said RHCP output of said wireless receiver.

6. The wireless receiver of claim 1,
wherein said wireless receiver is mounted on a vehicle, and
wherein a movement of said vehicle causes a change in a position of said wireless receiver.

7. The wireless receiver of claim 1, wherein said H-combined/V-combined generation block receives a horizontally-polarized signal and a vertically-polarized signal from each antenna in said antenna panel.

8. The wireless receiver of claim 7, wherein at least one of said horizontally-polarized signal and said vertically-polarized signal is phase-shifted in said H-combined/V-combined generation block.

9. A method, comprising:
in a wireless receiver:
generating an H-combined output, corresponding to a plurality of horizontal paths, based on signals received from an antenna panel,
wherein said plurality of horizontal paths include a plurality of first elements;
generating a V-combined output, corresponding to a plurality of vertical paths, based on said signals received from said antenna panel,
wherein said plurality of vertical paths include a plurality of second elements;
calibrating, said H-combined output and said V-combined output based on a ratio of a V-combined output power of said V-combined output and an H-combined output power of said H-combined output, to correct for an undesired variation in said H-combined output and V-combined output,
wherein one of said plurality of first elements or said plurality of second elements are turned off for determination of said ratio; and generating a left-handed circularly polarized (LHCP) output and right-handed circularly polarized (RHCP) output, based on said calibrating said H-combined output and said V-combined output.

10. The method of claim 9, wherein said calibrating said H-combined output and said V-combined output reduces a bit error rate in said LHCP output and RHCP output of said wireless receiver.

11. The method of claim 9, wherein said generating said H-combined output and said V-combined output comprises receiving a horizontally-polarized signal and a vertically-polarized signal from each antenna in said antenna panel.

12. The method of claim 11, wherein at least one of said horizontally-polarized signal and said vertically-polarized signal is phase-shifted.

13. A wireless receiver, comprising:
an antenna panel coupled to an H-combined/V-combined generation block;
corresponding to a plurality of horizontal paths, from said H-combined/V-combined generation block,
wherein said plurality of horizontal paths include a plurality of first elements;
a V-combined output, corresponding to a plurality of vertical paths, from said H-combined/V-combined generation block,
wherein said plurality of vertical paths include a plurality of second elements;
an axial ratio and cross-polarization calibration block to correct for an undesired variation in said H-combined output and said V-combined output, based on a ratio of an H-combined output power of said H-combined output and a V-combined output power of said V-combined output,
wherein one of said plurality of first elements or said plurality of second elements are turned off for determination of said ratio; and
a circularly polarized output based on said correction of said H-combined output and said V-combined output.

14. The wireless receiver of claim 13, wherein said undesired variation is due to a change in a position of said antenna panel.

15. The wireless receiver of claim 14, wherein said change in said position is a change in an elevation angle of said antenna panel.

16. The wireless receiver of claim 13, wherein said undesired variation is due to a change in a position of a transmitter providing transmit signals to said wireless receiver.

17. The wireless receiver of claim 13, wherein said axial ratio and cross-polarization calibration block reduces a bit error rate in said LHCP output and RHCP output of said wireless receiver.

18. The wireless receiver of claim 13,
wherein said wireless receiver is mounted on a vehicle, and
wherein a movement of said vehicle causes a change in a position of said wireless receiver.

19. The wireless receiver of claim 13, wherein said H-combined/V-combined generation block receives a horizontally-polarized signal and a vertically-polarized signal from each antenna in said antenna panel.

20. The wireless receiver of claim 19, wherein at least one of said horizontally-polarized signal and said vertically-polarized signal is phase-shifted in said H-combined/V-combined generation block.

* * * * *